Figure 1:
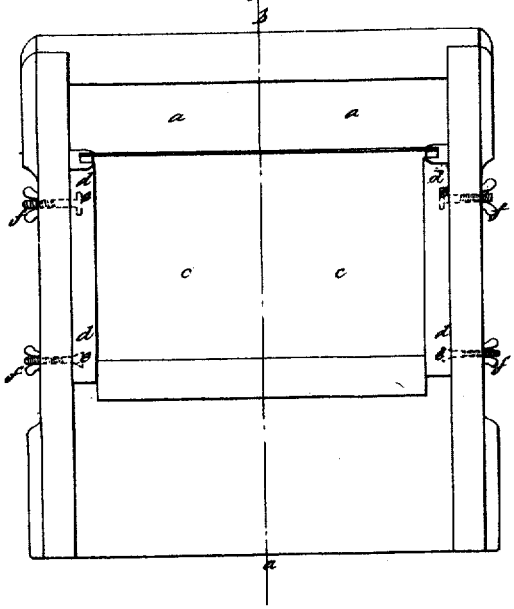
Figure 4:
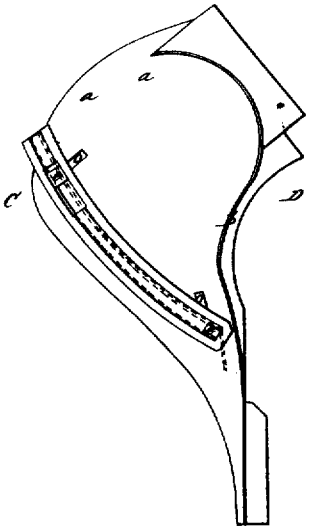
Figure 2:
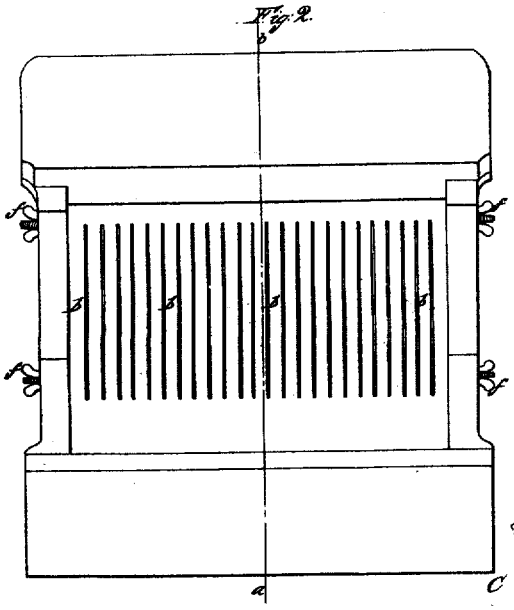
Figure 5:
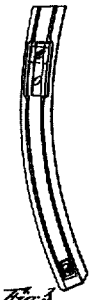
Figure 6:
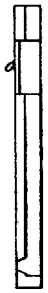
Figure 3:
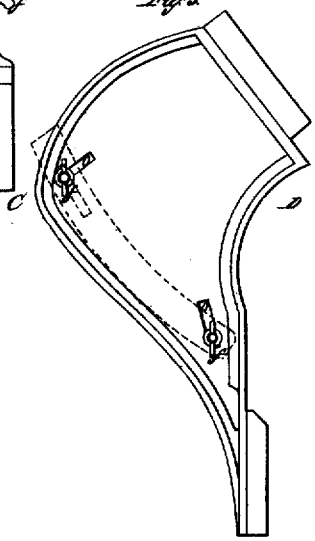

8257X

J. PERKINS.

Cotton Gin.

Patented June 14, 1834.

Section

THE NORRIS PETERS CO., PHOTO-LITHO., WASHINGTON, D. C.

8257X
June 14, 1834

Jacob Perkins
Letters Patent

The Schedule referred to in these Letters Patent (and making
part of the same, containing a description in the words of the said
Jacob Perkins himself of his improvement in the cotton Gin To all to whom these presents shall come: Be it
known that I, Jacob Perkins of Bridgewater, in the county of
Plymouth, (and State of Massachusetts, have invented a new & useful
improvement in the cotton Gin, consisting of a moveable grove either
straight or curved to which the seed board is attached, (and that
the following is a full (and exact description of the construction and
operation of the said machine as invented or improved by me.

In a frame to be made of such size and dimensions as will suit
it to the Gin, in which it is to be used, are attached two cast-iron heads, one
at each end, in order to support and adjust the movement of the seed board.
These heads are made of iron or other metal in order to prevent the expansion
(and contraction so considerable in wood. In each head at the end furthest
from the feeding opening is a slot or slit, opening in the direction intended to be
given to the seed boards, at the upper ends from that, or that nearest the feeding opening is another slot formed nearly at right angles with the first one,
thereby allowing a sidelong motion to the said boards. Through these slots work
thumb screw bolts, the head of the lower one to be screwed in the moveable groove
extending upwards to the other slot, where the bolt passes through it, and
works in a slot in said groove or grooves thereby allowing it to rise or fall at
pleasure. These moveable grooves are to be made either straight or curved at pleasure
The grooves are to be made of iron or other metal and to be of proper dimensions
to slide upon the head or heads above mentioned, where by the movement
previously provided for in the arrangement of the heads, they may be raised or de-
pressed, or drawn up, or down as may best suit the situation required These grooves are attached to grate fall heads, and are then ready
for operation My claim is for the above described groove or grooves made move
-able, attached to the requisite apparatus or arrangement.

In witness that the foregoing is a true specification of my
improvement as invented by me, I have hereunto set my hand this
twenty sixth day of May in the year eighteen hundred & thirty four Jacob Perkins Witnesses
Aaron Hobart
Nathan Lazell make (450 words) (Patented the 14th day of June 1834) Exd. W.J.C.